June 15, 1954     F. H. BLANDING ET AL     2,681,304
CRACKING OF HYDROCARBON OILS WITH SELECTED POROUS
SILICA-ALUMINA CRACKING CATALYSTS, IN TWO STAGES
Filed Oct. 21, 1950
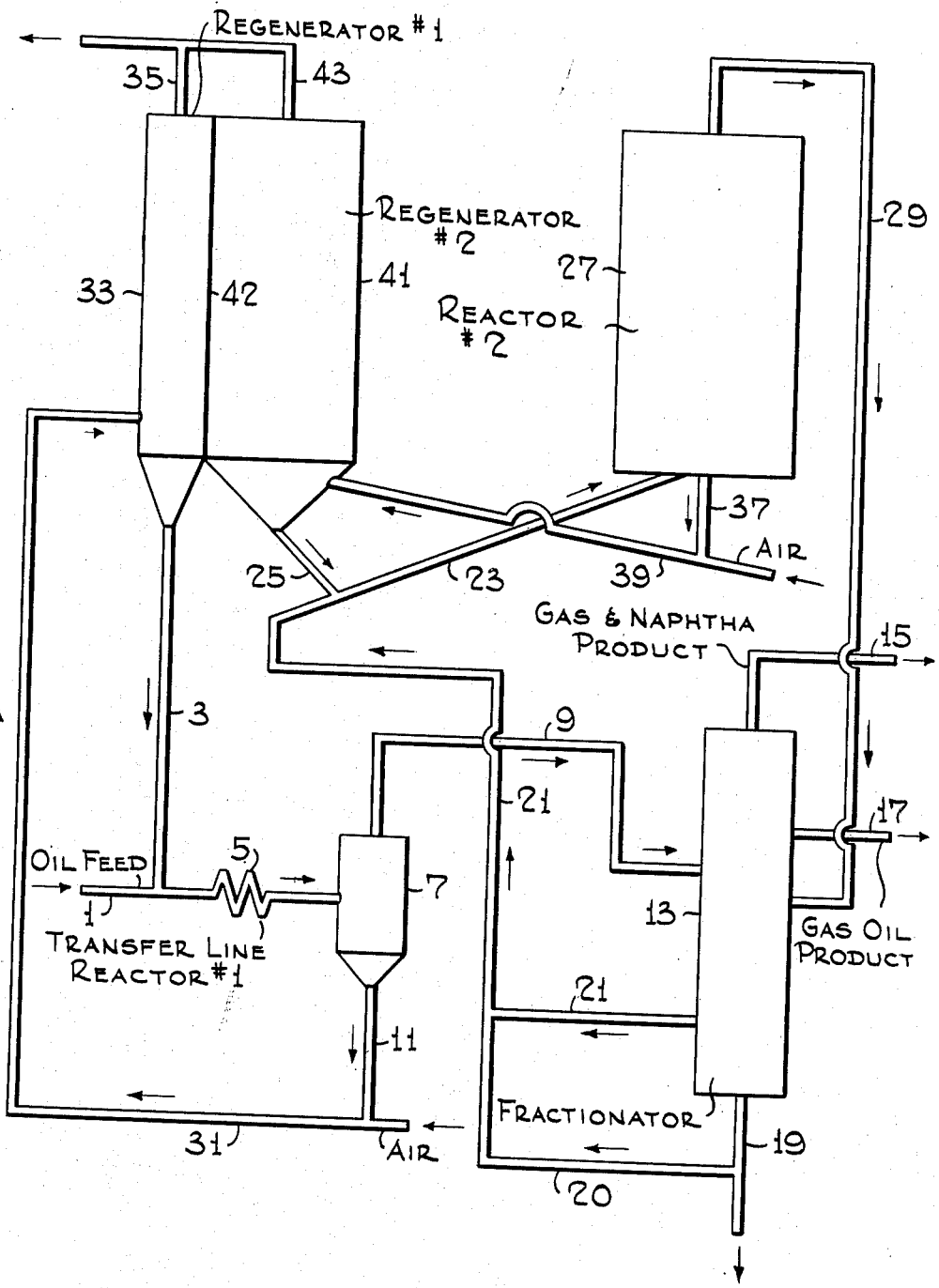
Forrest H. Blanding
John D. Leslie   Inventors
By George J. Silbay Attorney Patented June 15, 1954

2,681,304

UNITED STATES PATENT OFFICE 2,681,304

CRACKING OF HYDROCARBON OILS WITH SELECTED POROUS SILICA - ALUMINA CRACKING CATALYSTS, IN TWO STAGES

Forrest H. Blanding and John D. Leslie, Cranford, N. J., assignors to Standard Oil Development Company, a corporation of Delaware Application October 21, 1950, Serial No. 191,414

7 Claims. (Cl. 196—49)

This invention relates to the catalytic conversion of hydrocarbon oils into lower boiling products and to improved catalysts for carrying out such conversions. More specifically, the invention pertains to the catalytic cracking of cyclic and/or acyclic gas oil range hydrocarbons in the presence of catalysts having optimum cracking activity for the specific type of feed stock involved. This optimum cracking activity is attained in accordance with the invention by adjusting average catalyst pore diameters within the approximate range of 20 to 120 Å or higher as a function of the cyclic or acyclic character of the feed stock.

Processes for the catalytic cracking of relatively high boiling hydrocarbon oils such as gas oils to form gasoline range hydrocarbons of high octane rating are well known in the art and have been used commercially for quite some time. Various types of useful catalysts have been developed, the most active of which include certain adsorbent materials such as natural or synthetic clays, composites of silica with alumina, magnesia and/or boria, etc. Also activated carbon and alumina have been used.

Prior to the present invention it has also been discovered that pore size is one variable which strongly affects the activity of cracking catalysts made from synthetic silica gels containing other metal oxides, particularly alumina or magnesia, toward the formation of gasoline range hydrocarbons. In general, these discoveries seemed to indicate that cracking activity increases as catalyst pore diameter decreases. Thus, it has been suggested to improve the cracking activity of these gel-type catalysts by maintaining the pore diameters predominantly below about 20 Å, a minor proportion of the active pore volume having pore sizes up to 400 or 500 Å. The average pore diameter of the most widely used commercial cracking catalyst of the synthetic silica gel-alumina type is of the order of 20–40 Å. More recently, it has been disclosed that the selectivity of silica-alumina cracking catalysts toward the formation of gasoline range hydrocarbons may be improved by properly correlating the alumina content, specific surface, particle density and average pore diameter, the latter being maintained at least at 50 Å. and preferably between about 55 and 75 Å.

The beneficial influence of maintaining the pore diameter within the order of magnitude referred to above has been demonstrated at least qualitatively for feed stocks of different origin and composition. However, the degree of the improvement obtainable by controlling the pore diameter in this manner has been observed to vary appreciably for feed stocks of different composition. Heretofore, no explanation of these variations has been published nor has any method been disclosed for avoiding the same. As a result, many commercial cracking operations have been run at relatively low efficiency. The present invention substantially alleviates this difficulty as will appear from the description given below wherein reference will be made to the accompanying drawing the single figure of which is a schematical flow plan of a system adapted to carry out a preferred embodiment of the invention.

It has now been found that the cracking activity of porous cracking catalysts increases for cyclic feed stocks containing naphthenes and/or aromatics and decreases for acyclic feed stocks rich in paraffins, as the average pore diameter increases within the range of about 20–120 Å. More particularly, it has been discovered that the optimum pore diameter of cracking catalysts is about 50–120 Å. for cyclic hydrocarbons particularly double ring naphthenes and aromatics and about 20–50 Å. for acyclic hydrocarbons of the paraffin series. These findings are illustrated by the experimental data tabulated below, which were obtained by subjecting cetane and decalin as individual feeds separately to cracking on the catalysts listed at 950° F., 0 p. s. i. g. and 2.0 v./v./hr. in fixed bed operation. The average pore diameter of the catalysts was calculated in a conventional manner by the equation $PD=(4V/S)\times 10^4$ where PD is the pore diameter in Å. (angstrom) units, V the pore volume in cc. per gram and S the surface area in sq. meters per gram. The surface area was determined by the well known method of Brunauer, Emmett and Teller[1] employing the nitrogen adsorption isotherm at liquid nitrogen temperature. The pore volume was determined from the total absorption of nitrogen at liquid nitrogen temperature including that absorbed by capillary condensation.

TABLE I

| Run No. | Catalyst | Conversion, Percent | | Ratio of Conv., Dec./Cetane | Average Pore Diameter, Å. | Surface Area, M²/g. |
|---|---|---|---|---|---|---|
| | | Cetane | Decalin | | | |
| 1 | Activated Carbon | 85.8 | 20.4 | 0.24 | 20.5 | 1008 |
| 2 | 35% MgO–65% SiO₂ | 48.8 | 25.0 | 0.51 | 24 | 408 |
| 3 | 13Al₂O₃–87SiO₂ | 43.1 | 49.4 | 1.15 | 35 | 450 |
| 4 | 40Al₂O₃–60SiO₂ | 53.0 | 49.2 | 0.93 | 36.2 | 456 |
| 5 | Super-Filtrol | 42.1 | 50.1 | 1.19 | 37.5 | 332 |
| 6 | 40Al₂O₃–40SiO₂–20B₂O₃ | 68.5 | 38.0 | 0.56 | 38 | 340 |
| 7 | 80Al₂O₃–20B₂O₃ | 57.1 | 67.5 | 1.18 | 47 | 340 |
| 8 | 100Al₂O₃ | 28.5 | 52.9 | 1.86 | 63 | 230 |
| 9 | Catalyst of Run No. 3 after Approx. 500 Hrs. on Stream. | 29.2 | 63.3 | 2.08 | 75 | 111 |

The experiments summarized in the above table demonstrate that a definite functional relationship exists between the catalyst pore diameter and the cracking activity of the catalyst, expressed as percent conversion, for cetane on the one hand and decalin on the other hand. As the pore diameter increased from about 20 Å to about 75 Å, cetane conversion decreased from about 86% to about 29%, decalin conversion increased from about 20% to about 60% and what is most significant, the conversion ratio decalin/cetane increased from 0.24 to 2.08. Since only the relative conversions of the feed materials need be considered for each catalyst, these results are independent of the surface area. Of particular interest are runs Nos. 3 and 9 in which identical catalysts were used differing merely in the pore diameter from 35 Å to 75 Å, resulting in an increase of the conversion ratio decalin/cetane by almost 100%.

Table I shows that for paraffins, cracking activity increases as surface area increases which is in accordance with expectation. However, for naphthenes, catalyst activity increases as surface area decreases and this is against any expectation and may only be explained as the effect of the increase in pore diameter. Thus, it may be generally stated that for cracking of acyclic hydrocarbons catalysts having high surface area should be used, which means that catalysts with small pore diameters within the ranges specified are preferable for this purpose. For cyclic hydrocarbons, increase of surface area of the catalyst has no beneficial effect below a certain pore diameter which lies in the neighborhood of about 100 Å. for double ring compounds. At or above this pore size, further improvements in conversion may be obtained in accordance with conventional relationships by increasing surface area without decreasing pore size.

Further experimental data indicate that with respect to cyclic hydrocarbons, particularly aromatic hydrocarbons, containing more than two carbon rings per molecule, catalyst pore diameters substantially in excess of 120 Å., say pore diameters of about 200–400 Å., may be required for best results. In general, it may be stated that for hydrocarbons of this type boiling within the range of about 400–900° F. or higher, the pore diameter of the cracking catalyst should be the greater within the range of about 120–400 Å. the higher the molecular weight of the hydrocarbons.

Based on the findings reported above the present invention provides for the adjustment of the pore diameter of cracking catalysts as a function of the cyclic or acyclic character of the hydrocarbon feed stock to be cracked, catalysts having average pore diameters of about 20–50 Å., preferably about 20–40 Å., being used for predominantly acyclic, particularly paraffinic, feed stocks and catalysts having pore diameters of 50–120 Å., preferably about 60–80 Å., being used for predominantly cyclic, particularly double ring naphthenic, feed stocks. The invention finds its greatest utility in the cracking of mixed paraffinic-naphthenic feed stocks, in which case a substantial improvement of the total conversion into lower boiling hydrocarbon products may be obtained by employing catalysts having a wide distribution of pore diameters throughout the approximate range of 20–120 Å. or higher.

In accordance with the preferred embodiment of the invention, mixed cyclic-acyclic cracking feed stocks of the type specified above are cracked in two stages. In the first stage the incoming gas oil feed may be contacted with a catalyst of large pore diameters of, say, about 60–80 or 100–160 Å., depending on the boiling range of the feed used at relatively short contact times, particularly in a transfer line type of reactor to selectively convert the cyclic hydrocarbons in the gas oil. Thereupon the cracked oil withdrawn from the first stage may be cracked in the second stage with a catalyst of relatively small pore diameters of, say, about 20–40 Å. at longer contact times to selectively convert the acyclic hydrocarbons. If desired, gasoline produced in the first stage may be separated from the first stage effluent between stages.

The catalysts of different pore diameters may be selected among conventional cracking catalysts known to have the desired pore diameter distribution. For example, any one of the small pore diameter catalysts used in runs Nos. 1–7 of the above table may be employed as the catalyst for cracking selectively acyclic feed stocks or feed stock components, while the large pore diameter catalysts of runs Nos. 8–9 may serve

---

[1] J. Amer. Chem. Soc., vol. 60 : 309 (1938).

for selectively cracking cyclic feed stocks or feed stock components in the manner described above. The pore diameter of catalysts of any given desirable chemical composition may also be controlled by a number of known procedures to obtain the desired pore size distribution. For example, the pore diameter of the gel catalysts can be controlled and adjusted by the method used in treating the material while it is still in the hydrous state during manufacture. The use of cold or acidic wash water or aging at low temperature or at low pH will, in general, cause a decrease of pore size. Freezing the hydrous gel will, in many cases, result in gels of very small pore diameters. On the other hand, washing with warm water and/or at a high pH or aging at high temperature and/or high pH will, in many cases, result in gels having high pore diameters. The incorporation of various organic solvents such as ketones, alcohols, etc. with the hydrous gels or the addition of various surface active agents that tend to lower the surface tension of water to the hydrous gel will frequently lead to a product having high pore diameters. Drying at low temperatures generally results in low pore diameters. Drying at high temperatures or under pressure or in an atmosphere of steam generally leads to products having a high pore diameter. The addition of fluorides such as hydrofluoric acid to hydrosols, particularly silica hydrosol leads to products having very high pore diameters. Each gel should be treated as an individual case and the method of controlling pore diameter most suitable to the individual case chosen.

While the pore diameter of the catalyst is chiefly responsible for its selective activity towards cyclic or acyclic feed stocks, over-all cracking activity increases normally as the surface area of the catalyst increases. It is desirable, therefore, to prepare the catalysts for the present invention in such a manner as will lead to a high surface area along with the desired pore diameter. This may be accomplished, for example, by achieving the highest practical degree of colloidal dispersion while the gel is in the hydrous state. Thus, true hydrosols and hydrogels are to be preferred to gelatinous precipitates in the manufacture of catalysts. Likewise, the use of dilute solutions are to be preferred over concentrated solutions in gel manufacture.

However, the preferred modification of the present invention involves the use of silica-alumina cracking catalysts of the type employed in runs No. 3 and No. 9 of the above table. These catalysts are well known composites of silica gel and alumina containing about 10–25%, preferably about 10–15% by weight of alumina. As indicated in the above table, the pore diameter of catalysts of this type may be increased from about 35 Å. of the fresh catalyst to about 75 Å. by merely subjecting the catalyst to cracking conditions, particularly in the presence of steam, for about 100–1,000 hours, particularly in a system involving continuous or periodic regeneration of the catalyst at temperatures of about 1000°–1150° F., until the catalyst has reached its equilibrium condition with respect to operation under a given set of conditions. Fresh catalyst of this type may, therefore, be used as the catalyst for the selective cracking of acyclic feed stocks or feed stock components and used catalyst of the same type for the selective cracking of cyclic, particularly naphthenic feed stocks, and feed stock components, in accordance with the invention. The striking selective cracking activities of these two modifications of the same catalyst, particularly toward the formation of gasoline range hydrocarbons from naphthenic and paraffinic gas oil range hydrocarbons, respectively, are illustrated by the experimental fixed bed data tabulated below.

TABLE II

| Catalyst | Cracking of Decalin 13Al$_2$O$_3$-87SiO$_2$ | | Cracking of Cetane 13Al$_2$O$_3$-87SiO$_2$ | |
| --- | --- | --- | --- | --- |
| | Equilibrium | Fresh | Equilibrium | Fresh |
| Pore Diameter | 75 | 35 | 75 | 35 |
| Temperature, °F | 950 | 950 | 950 | 950 |
| Pressure, p. s. i. g | 0 | 0 | 0 | 0 |
| Space Velocity, v./v./hr | 2 | 2 | 2 | 2 |
| Conversion, percent | 63.3 | 49.4 | 29.2 | 45.0 |
| Dry Gas, wt. percent | 3.9 | 7.6 | 9.0 | 13.2 |
| C$_4$, wt. percent | 4.9 | 10.4 | 7.4 | 14.5 |
| C$_5$+ Naphtha,* Vol. percent | 57.6 | 38.8 | 14.2 | 17.4 |

*Converted products only.

The above data demonstrate the excellent utility of this preferred catalyst in the fresh and equilibrium states for the selective cracking of cyclic and acyclic hydrocarbon oils in accordance with the present invention.

The catalytic cracking in accordance with the invention may be carried out at conventional conditions including temperatures of about 700°–1100° F., pressures ranging from subatmospheric pressures up to several hundred pounds, and contact times of about 0.5–20 seconds, all properly correlated to suit the particular feed stock and catalyst involved. The catalyst may be regenerated by a treatment with oxidizing gases such as air, oxygen, steam, flue gases, or mixtures thereof to remove carbonaceous deposits in a manner known per se. When operating in two stages containing catalysts of different pore diameters the cracking conditions in the individual stages may be adjusted so as to be optimum for the cracking of naphthenic and paraffinic hydrocarbons, respectively, the latter normally requiring more severe cracking conditions than the former, within the ranges just specified.

The invention will be further illustrated by the following specific example.

*Example*

A gas oil having a boiling range of 500–900° F. and an average boiling point of 675° F. is used, which contains 35% naphthenes, 47% paraffins, and 18% aromatic compounds, and which is charged to a reactor No. 1. Reactor No. 1 contains a finely divided fluidizable silica-alumina cracking catalyst (about 13% Al$_2$O$_3$) of 100 Å. pore diameter, having a surface area of 97 square meters per gram. Conditions in reactor No. 1 are 900° F., a catalyst/oil ratio of 7 and a contact time of 10 seconds. Reactor 1 consists of a tall narrow tube, and a linear superficial vapor velocity of 7.5 ft. per second is employed therein.

The total conversion at the above conditions in reactor 1 is 38% of the feed stock to products boiling in and below the gasoline boiling range. In reactor No. 1 30% naphthenes, 6% paraffins and 2% aromatics, based on the original charge, are cracked for a total conversion of 38%. The very selective cracking of naphthenes is particularly noteworthy. Although the feed stock charged to reactor No. 1 contains impurities in the form of inorganic metal salts, in the amount of 10 lbs. per 1000 bbl. of charge, the stock leaving reactor No. 1 contains only 2 lbs./1000 bbl. of impurities. The carbon deposit in reactor No. 1 amounts to only about 1 weight per cent of the charge.

Products from reactor No. 1 are then fed to a fractionator where gasoline and lower boiling products are removed. The gas oil, consisting predominantly of paraffins and aromatics is fed to a reactor No. 2. A finely divided fluidizable silica-alumina cracking catalyst (about 13% $Al_2O_3$) having a pore diameter of 38 Å. and a surface area of 220 sq. m./gm. is used in reactor No. 2. A catalyst/oil ratio of 8, and a contact time of 12 seconds is used in reactor No. 2 at a linear superficial vapor velocity of 5 ft./sec. A temperature of 900° F. is employed in reactor No. 2 and a conversion of 50% is obtained in this reactor. Products are led to a fractionator and separated. Catalyst from reactors Nos. 1 and 2 is regenerated in separate regenerators. Yields produced in these operations are as follows:

|  | Reactor #1 [1] | Reactor #2 | | Total [2] |
| --- | --- | --- | --- | --- |
|  |  | (1) | (2) |  |
| Conversion | 38.0 | 50.0 | 31.0 | 69 |
| Gasoline, C4+, vol. percent | 37.1 | 43.0 | 26.6 | 63.7 |
| Gas, C3 and lighter, wt. percent | 3.5 | 6.0 | 3.7 | 7.2 |
| Coke, wt. percent | 1.3 | 5.5 | 3.4 | 4.7 |
| Gas oil, vol. percent | 62.0 | 50.0 | 31.0 | 31.0 |

[1] Based on feed to reactor.
[2] Based on original feed.

As compared with the above yield of 63.7% of C4+ gasoline, a conventional operation, in one reactor, with an average pore diameter catalyst of 60 Å., and 120 sq. m./gm. surface area requires a much larger reactor volume than the combined volume of the above reactors. Yields obtained in this operation are at 69% conversion of gas oil, 7.5% of coke, 10.0% of gas, and only 58% of C4+ gasoline. The marked advantage of the two step operation is apparent.

The process of the invention may be carried out in any of the systems well known in the art of catalytic cracking, that is in fixed bed, moving bed, fluid catalyst or suspensoid operation, as will be fully understood by those skilled in the art. A system which may be used to particular advantage for the purposes of the invention will now be described with reference to the drawing.

Referring now in detail to the drawing, a naphthenic gas oil of the type of a Coastal crude, 430–700° F. boiling range may be supplied to line 1 at a temperature of about 300° to 900° F. Simultaneously, line 1 receives from line 3 about 3 to 10 lbs. of a subdivided cracking catalyst per lb. of oil supplied. This catalyst should have a pore size of about 60–100 Å. It may have an average particle size of about 30 to 70 microns and may be supplied to line 1 at a temperature of about 1000° to 1200° F. as will appear more clearly hereinafter so as to vaporize the oil. The catalyst which may be a used silica-alumina composite of the type described above may also contain a significant amount of iron and other contaminants inasmuch as there is some indication that catalyst so contaminated may produce greater amounts of aromatics from naphthenes than will uncontaminated catalyst. In cases where a heavier gas oil is used, as for example a 700–1100° F. V. T. (vapor temperature) boiling range gas oil, a pore size of 100–150 Å. should be used in reactor No. 1.

The catalyst-oil mixture which may now have a temperature of about 800° to 1000° F. enters transfer line reactor 5 which may have the form of a conventional furnace coil. Conversion in reactor 5 is so controlled that only the majority of the naphthenes in the feed stock are converted, which usually corresponds to an overall conversion in reactor 5 of about 20–35%, depending on the naphthenic content of the gas oil. Conditions suitable for this type of operation include temperatures of about 850° to 950° F., pressures of about 5 to 50 p. s. i. g. and oil residence times of about 1 to 10 seconds, and catalyst oil ratios of 3–10.

From reactor 5 the oil vapors and catalyst may be passed into a vapor-solids separating zone, such as one or more cyclones 7 from which vapors may be withdrawn overhead via line 9. Separated catalyst may be withdrawn through line 11 to be further treated as will appear hereinafter. The oil vapors in line 9 may be passed to a fractionator 13. Gasoline formed in reactor 5 may be recovered from fractionator 13 via line 15 and removed from the system to avoid recracking in the second cracking stage which would result in a loss of gasoline yield. Product gas oil may be recovered via line 17 for any desired use. A slurry of catalyst fines in heavy bottoms may be removed via line 19.

A heavy gas oil range side stream withdrawn through line 21 is supplied to line 23 wherein it is admixed with about 3 to 15 lbs. of subdivided cracking catalyst per lb. of oil. This catalyst should have a pore size of about 20–50 Å. and a particle size of about 30–400 mesh. A relatively fresh silica-alumina composite is suitable for this purpose. The catalyst may be supplied from line 25 at a temperature of about 1000°–1150° F. as will appear hereinafter and the catalyst-oil mixture in line 23 may assume a temperature of about 800°–950° F. This mixture is then passed to second stage reactor 27 which is preferably designed for conventional fluid-catalyst type of operation involving fluidizing gas velocities of about 0.3–3 ft. per second, apparent bed densities of about 20–50 lbs. per cu. ft. and hourly oil feed rates of about 2 to 25 lbs. of oil per lb. of catalyst in the reactor. Second stage product vapors may be withdrawn through line 29, preferably after conventional solids separation (not shown), and passed to fractionation which may take place in a separate fractionation zone or in fractionator 13 as shown in the drawing. In the latter case, a recycle type of operation will result in which the gas oil, preferably the heavy gas oil, is recycled via line 21 to second stage reactor 27 only. Recycling in this manner is advantageous, inasmuch as all gas oil withdrawn from fractionator 13 will be low in naphthenic constituents and will thus form a feed stock much more suitable for the second stage reactor 27 than for the first stage reactor 5 which serves primarily for the cracking of naphthenic oil constituents. If desired, a portion of the bottoms withdrawn through line 19 may be passed through lines 20, 21 and 23 to second stage reactor 27, preferably after removal of suspended first stage catalyst by filtering or similar means (not shown).

Returning now to separator 7, the catalyst separated therein and withdrawn via line 11 may be stripped in a conventional manner with steam or flue gases and passed into air feed line 31 to form a dilute solids-in-gas suspension therein which is passed on to a conventional, preferably fluid type regenerator 33 wherein a dense fluidized solids bed having an apparent density of about 20–50 lbs. per cu. ft. may be formed. Combustion of carbon on the catalyst takes place in regenerator 33 and the catalyst may be heated thereby to a temperature of about 1000°–1150° F. Flue gases may be withdrawn via line 35 and passed to any desired use. Regenerated catalyst is passed substantially at the temperature of its regeneration via line 3 to line 1 as described above.

Similarly catalyst from second stage reactor 27 may be withdrawn through line 37, suspended in air via line 39 and passed to regenerator 41 which may be operated in a manner similar to that described with reference to regenerator 33. Flue gases may be withdrawn through line 43 and hot regenerated catalyst is returned via line 25 to line 23 as described above.

As shown in the drawing, regenerators 33 and 44 may form two sections of a conventional single regenerator properly partitioned by wall 42 to prevent mixing of the two types of catalyst involved. There may be some catalyst carry-over from reactor 5 to reactor 27. In order to prevent or reduce such carryover, catalyst separation may be accomplished by the use of a magnetic type of separator, particularly when used cracking catalyst normally contaminated by iron is employed in the first stage. Also a small proportion of iron, say about 0.5 to 1.5% may be added to the first stage catalyst when magnetic separation is used. An undesirable increase in the pore diameter of the second stage catalyst due to extended use may be averted by periodically or continuously replacing used catalyst with fresh catalyst in the second stage as will be understood by those skilled in the art.

The catalytic cracking system illustrated in the drawing has several important advantages. In the first place, the effect of a guard catalyst is obtained by the use of a first reactor wherein feed contaminants are removed. The naphthenes are selectively cracked by a catalyst which may be contaminated. The fractionation of the superior quality gasoline from the first stage prevents its being overcracked in the second stage and results in a substantial improvement in yield of overall gasoline from the gas oil. A recycle operation may be employed in the second stage only and this results in further increases in gasoline yield and other advantages associated with recycle operation. Inasmuch as a low conversion is maintained in the first stage, the additional carbon production due to contamination will be very small, because overall carbon yields are much less than 1% on feed in this stage. It is also possible to crack significant quantities of reduced crude in a mixture of gas oils in such an operation, inasmuch as the contaminants are deposited on the catalyst in the first stage without greatly destroying its effectiveness, and the major portion of cracking paraffinic fractions takes place in the second stage. An additional advantage resides in the fact that relatively short contact times may be maintained in each stage and this permits high velocities resulting in better reactor efficiencies. This better reactor efficiency may result in a further substantial improvement in cracking results. For example, when operating as described with reference to the drawing, the use of high velocities in reactor 1, together with a smaller required amount of catalyst in reactor 2, results in the same conversion or amount of cracking taking place with only 50–75% as much catalyst as would be required in a single vessel reactor.

The foregoing description and exemplary operations have served to illustrate preferred embodiments of the invention but are not intended to be limiting in scope.

What is claimed is:

1. In a process of catalytic cracking of mixed naphthenic-paraffinic gas oils to form gasoline range hydrocarbons, the improvement which comprises suspending in said oils a hot subdivided porous silica-alumina cracking catalyst mixture consisting of particles essentially each of which has an average pore diameter within the approximate range of about 60–100Å, so as to vaporize said oils and to form a suspension of said catalyst in oil vapors maintained at cracking conditions for a time just sufficient to obtain an overall gas oil conversion of about 20 to 35% corresponding to the cracking of a majority of the naphthenic constituents of said oils, withdrawing a volatile effluent and suspended catalyst from said path, separating catalyst from said effluent, fractionating said effluent in a fractionation zone to produce a gasoline fraction, a gas oil fraction and bottoms, recovering said gas oil fraction, contacting at least a portion of said gas oil fraction with a hot subdivided porous silica-alumina cracking catalyst mixture consisting of particles essentially each of which has an average pore diameter within the approximate range of about 20–40Å, so as to vaporize said portion and to form a suspension of said last named catalyst in said vaporized portion, passing said last named suspension into a lower portion of an expanded reaction zone to form therein a dense turbulent mass of catalyst fluidized by an upwardly flowing gaseous medium, maintaining said mass at cracking conditions adequate to crack paraffinic constituents of said gas oils, said conditions approximating those of the first cracking step, and withdrawing volatile products containing gasoline hydrocarbons upwardly from said zone.

2. The process of claim 1 in which said oils are composed predominantly of naphthenes and paraffins and are cracked in said first stage in the form of a suspension of said first named catalyst in oil vapors, said suspension being passed at high velocity through an extended narrowly confined path maintained at cracking conditions and so cracked to an overall conversion of about 20 to 38%.

3. The process of claim 1 in which said products withdrawn from said first stage are fractionated to produce a gasoline fraction and a predominately paraffinic gas oil fraction, said gasoline fraction being recovered and the separated gas oil being cracked in said second stage.

4. The process of claim 1 in which said first named catalyst is used silica gel-alumina cracking catalyst containing about 10–25% of alumina and said second named catalyst is fresh catalyst of the same type.

5. The process of claim 1 in which said second catalyst is maintained in said second stage in the form of a dense turbulent mass fluidized by an upwardly flowing gasiform medium.

6. The process of claim 1 in which said first stage vapor residence time is about 1 to 10 seconds.

7. The process of claim 1 in which said first named catalyst is a silica gel-alumina composite which has been previously used for an extended time in catalytic cracking and said second named catalyst is the same composite in a relatively fresh state.

References Cited in the file of this patent

UNITED STATES PATENTS

| Number | Name | Date |
|---|---|---|
| 2,257,157 | Connolly | Sept. 30, 1941 |
| 2,348,418 | Roesch et al. | May 9, 1944 |
| 2,353,731 | Kanhofer | July 18, 1944 |
| 2,385,216 | Marancik et al. | Sept. 18, 1945 |
| 2,396,109 | Martin | Mar. 5, 1946 |
| 2,428,715 | Marisic | Oct. 7, 1947 |
| 2,444,131 | Seguy | June 29, 1948 |
| 2,461,958 | Bonnell | Feb. 15, 1949 |
| 2,471,078 | Ogorzaly | May 24, 1949 |
| 2,487,796 | Evans | Nov. 15, 1949 |
| 2,631,968 | Peery | Mar. 17, 1953 |

OTHER REFERENCES

Aging of Cracking Catalysts, G. A. Mills, Ind. and Eng. Chem., vol. 42, pages 182 and 183, January 1950.